Figure 1:
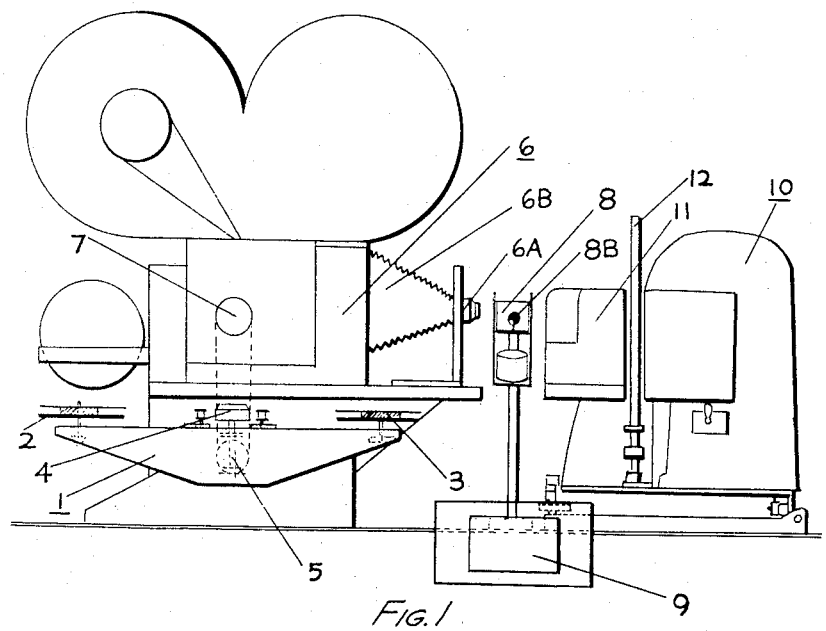

March 17, 1959 R. F. H. HILL 2,877,684
FILM RECORDER
Filed Feb. 13, 1956

RICHARD F. H. HILL
INVENTOR
BY M?Carthy · M?Carthy
PATENT AGENTS

United States Patent Office 2,877,684
Patented Mar. 17, 1959

2,877,684

FILM RECORDER

Richard F. H. Hill, Toronto, Ontario, Canada, assignor to Williams & Hill Limited, Toronto, Ontario, Canada Application February 13, 1956, Serial No. 565,230

2 Claims. (Cl. 88—16.2)

This invention relates to the motion picture making art, and in particular to that portion of the art wherein it is sought to produce a movie film having synchronized sight and sound tracks.

A commercial movie film can be made in at least two ways (a) by "live" shooting in a studio or other location. In such a case the sound might be recorded simultaneously with the action or the sound might be recorded separately and dubbed onto the visual portion of the film, or (b) by the process known as "animation" whereby a separate drawing is made for each phase of the motion, and a camera, exposing only a few frames at a time, photographs these successive phases.

Of these two methods the former requires the large number of re-takes so well known in the art, to compensate for the mistakes and omissions, not only of those persons photographed, but also of technicians and others engaged in the project. It is not unusual for a single scene to be shot 10 or more times before a satisfactory "take" is recorded. The latter, on the other hand is slow and expensive in the amount of artwork required, and the necessity for a separate photographic record of each phase in a movement being time consuming and requiring large capital equipment beyond the reach of the small studio.

In addition, both of the above conventional means suffer from what is probably the most serious disadvantage of all—the necessity for editing of the completed film, i. e. the selection of the desired duration of each separate scene recorded, and the unification of all the scenes into a coherent progression. The editor of a film, it has been recognized, has one of the most difficult and demanding of all positions in the production of a film, and no matter how skillful the editor is, a certain minimum of time is required to discharge his function. In addition, the necessity for editing, splicing and reprinting adds greatly to the cost of the completed film.

Furthermore, there are certain basic optical effects which, if required in the production of a film by either of the aforesaid means, may only be done in an optical laboratory. For instance, while the rapid transition from one scene to another may easily be accomplished by splicing one scene directly onto another, common film effects, for example, the fade-in or fade-out and the overlap, must be made to order in a laboratory for the particular film in question, thus adding not only to the cost, but also to the time required to produce a finished print.

The advent of television and of television advertising has created a need for a high quality movie film, synchronized to sound, which provides a series of separate scenes, or illustrations with or without certain basic visual effects, but which, above all, may be quickly, and to a lesser extent cheaply created to order. Often only a very limited form of animation or no animation at all is required in such films, but merely a sequence of separate stationary illustrations depicting the subject matter of the sound, to which such film must be accurately synchronized. Such films are of relatively short duration, seldom longer than one minute, and often as short as eight seconds.

It is a principal object of this invention, therefore, to provide an apparatus and method whereby a commercial movie film print, accurately synchronized to recorded sound and suitable for television advertising purposes, may be provided through a single filming without the necessity of editing.

It is another principal object of this invention to provide a means and method whereby a higher quality film may be produced with greater facility than has heretofore been possible.

It is a further important object of this invention to provide such an apparatus and method as will permit of the direct filming of certain basic effects such as dissolves, fade in and out, wipes, and overlap in their proper sequence on the original negative before it is processed, thus eliminating the necessity for special optical printing and its consequent editing.

It is a still further object of this invention to provide such an apparatus and method as will permit of the depicting of a form of animation.

It is another object of this invention to provide such an apparatus and method as will permit the manufacture of such a commercial film print in substantially less time than has heretofore been possible, and at a considerable saving in cost.

Figure 2:
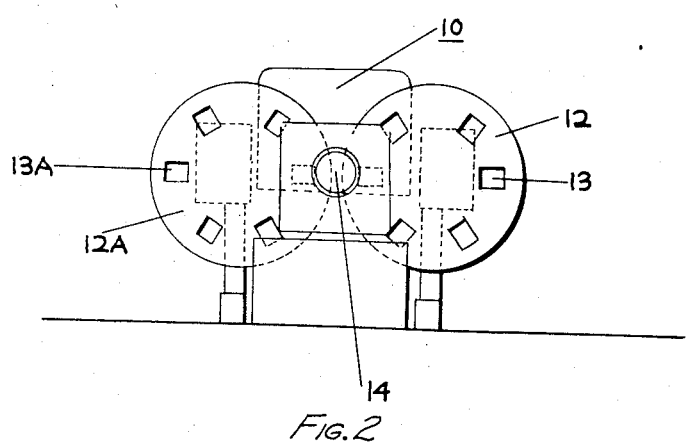

These and other advantageous objects will become apparent through a consideration of the following detailed description, taken in conjunction with the attached drawings in which Figure 1 is a schematic side view of a movie filming device constructed so as to embody features of my invention, and Figure 2 is a schematic view taken generally along line 2—2 of Figure 1.

The method of this invention consists broadly in pre-recording the desired sound, and running this sound at or below normal speed while casting a series of images into a fixed motion picture camera, by means of a fixed image system.

In greater detail, and referring now to the drawings which illustrate one embodiment of the invention, the invention as illustrated comprises four basic components, namely, (1) An image illumination system 10 shown here for purposes of illustration as of the type containing two revolving turrets 12 and 12A whereby two slides are capable of being in operative position simultaneously as will be described in detail hereinafter;

(2) A movie camera of conventional design and function indicated generally as at 6;

(3) Sound cuing system indicated generally as at 1; and (4) The monitoring system indicated at 8 and 9.

The image system comprises an adaptation of a known type of projector having two revolving turrets in which a number of slides 13, 13A may be mounted. One slide in each turret is always in illuminable position, two independent light sources being provided, one for each turret, and these sources may be dimmed and/or switched independently of each other. An arrangement of lenses, prisms, etc. is also provided being operative to transmit an image of one or the other slide through the lens 14 and into the camera lens 6A in the manner already described, depending upon which of the two light sources is, for the moment, operating. The slide carriers must be such as to permit of fine positioning or adjusting of the slides in their respective mounts. The turret rotating and locking means must also possess a high degree of accuracy for reasons which will become apparent hereafter.

The construction of this type of illumination system, save as hereinafter outlined in detail, does not form part of this invention, and since these illumination systems are well known in the art, constructional details will not be described.

The conventional illumination system of this two turret type will have a control for actuating each of the two turrets. Upon actuation of each such control, the appropriate turret is caused to revolve, and automatically stop with the next slide in the series in projectable position in front of its light source. While one slide is illuminated, the other may be changed to bring the next slide in the sequence into position for illumination. Such conventional projectors are also commonly provided with a control for the light sources whereby (a) A cut may be made from one fully illuminated source to the other, and/or (b) A fade may be made from one source to the other whereby the intensity of each source may be varied from zero to a maximum and either or both of the sources actuated.

Since the total intensity of light transmitted to the camera lens should not exceed a predetermined value for correct exposure of the movie film, the control means for the light sources must be such that if one light source is faded out and the other light source is simultaneously faded in, the total intensity of the two lights may be equal to but not greater than the maximum intensity of a single light. This may be done by matching the output of the variable resistors to the intensity characteristics of the light sources employed.

The operational controls for the illumination system will thus be the following:

(1) Controls; one for actuating each slide carrier to bring successive slides into operative position.

(2) Control for cutting from one light source to the other.

(3) Controls for varying the intensity of each light source from zero to a maximum, these controls being such that if both sources are actuated simultaneously, the total light intensity may be equal to but not greater than the maximum intensity of a single source.

(4) Separate controls for special optical effects such as horizontal and vertical wipe mechanisms.

(5) Control for the lateral positioning of each mounted picture allowing vertical, horizontal clockwise and counterclockwise alignment.

The camera system may employ any conventional form of movie camera. Because the distance from image to camera is so short, it will be necessary, in most cases, to remove the lens 6A of the conventional movie camera a short distance towards the image system. This has been done in the illustration of Figure 1. The distance required may easily be determined to ensure that the images cast from the image system are exactly in focus at the camera. The removed lens may then be connected to the camera body by means of a light tight bellows 6B. The image system and camera system are so mounted with respect to each other that the image for the time being illuminated is cast, in focus, onto the camera lens.

The sound cuing system indicated generally as at 1 is adapted to drive an optical sound track or a magnetic sound track, or a sprocketed cue tape. Means for reproducing the sound may also be included, in which case the system would take the form of a sound play-back, or it may be merely a drive mechanism. This unit is actuated through a suitable gear system, by the camera motor and in strict synchronization therewith so that when the camera is filming at normal filming speed (e. g. 24 frames per second for 35 or 16 mm.) the sound recording is moving at normal play-back speed. Thus if the camera be operated at a fraction of normal speed, this strict synchronization will ensure travel of the sound recording at the same fraction of normal speed.

The monitoring system is indicated generally at 8 and 9 and is adapted to give the operator of the system an exact image of the scene being filmed. A light transmitting mirror 8 is interposed between the camera and image systems and is adapted to transmit through itself a portion of the light impinging thereon, while reflecting the remainder onto the monitor screen 9 which is readily viewable by the operator. A combination of lenses 8A and a front surface mirror 8B are adjustable to cast a reliable and precise image upon the screen 9. The use of such a screen will enable the operator to ensure precise alignment of successive slides when so required for an animation type sequence.

The operation of these component parts is as follows:

The sound for the film is first recorded from the script, onto a sprocketed tape or optical film recorder of conventional design. The sprocketed tape or film containing this recorded sound or corresponding sprocketed cue tape is then placed in the sound cuing system 1.

A series of slides depicting the various sequences required by the script are placed in the turrets, scene 1 and all other odd scenes being on one turret and scene 2 and all other even scenes in the other. The turrets are rotated so that scenes 1 and 2 are in illuminable position in their respective turrets. The light source behind scene 1 may then be actuated.

It is possible that if the scene shifts are neither frequent nor complicated, the turrets and other image controls could be actuated by the operator to provide the necessary sequence of scenes against his perception of the sound as played in the play-back 1 at normal speed. If this is the case, the synchronization between play-back and camera will ensure that the camera is recording at the standard 24 frames per second.

Even if the scene changes are few and simple, however, it will generally be found that the operator will find it difficult to operate the image controls quickly or accurately enough. In such a case, the sound track might first be played and cued, i. e. a mark such as a grease pencil mark, or other indicia placed on the tape or other sound track itself to indicate the position of a scene change. The operator then could run the camera at a fraction of normal speed and, through the synchronization means already described, the cuing system will automatically run at the same fraction of its normal filming speed. At this reduced speed (and it has been found in practice that a speed of ⅙ normal gives good results) the operator will have ample time to provide scene changes with such visual effects as fade out and in, cut out and in, etc. as may be required by the script, through the appropriate manipulation of the image controls already described. If the sprocketed tape or film is run below normal speed, the operator will be guided in his operation of the image controls not by his audio perception of the sound, but by the cued indicia placed on the sprocketed tape or film as already described. For this reason, the play-back could be replaced by a simple take-off take-up mechanism since no sound is required.

In addition to simple scene changes, a form of animation can be provided in the practice of this invention. If successive slides differ only in minor particulars, and are otherwise identical, the appearance of motion or animation may be filmed in this minor particular. At speeds significantly below normal recording speed, it should be possible to show slide 1, then cut to slide 2, while changing slide 1 to slide 3, and then cut to slide 3, etc., each scene occupying only a few frames of the movie film. Judicious selection of the particular minor variation in otherwise identical slides will thus provide animation in the completed film when run at normal speed. In such sequences, however, the alignment of the slides and the rotating and locking precision of the image system become of prime importance, since the identical portions of successive slides must superimpose each other precisely or a "jumpy" effect will be perceptive. The judicious use of the monitor screen in achieving such alignment will ensure satisfactory results.

The use of the system already described affords the direct incorporation, into a finished print, of integrated live action or animation sequences. If it is desired to incorporate a live action film into a film produced by the manner of this invention, it would merely be necessary to run the film blank through the apparatus for the desired footage as cued by the sound system. On completion of the filming of the required scenes, the live action could merely be spliced into this blank portion. This type of editing is most basic and may be done quickly and easily.

After the picture has been filmed, the sound portion of the finished film may be printed from the sprocketed tape or film record, and the visual and sound recordings combined in the finished print in the usual manner, to give a completely synchronized sound movie film. Because the sound cuing system is synchronized to the movie camera, the two portions will be exactly synchronized and may be combined in the finished print without cutting of either.

It will be seen that the practice of this invention provides a movie film, synchronized to a pre-recorded sound without the necessity of editing the film. The film as withdrawn from the movie camera is complete and of a high quality since no focus, or total light intensity variations are normally required throughout the filming. Each scene is of exactly the correct length and is in the proper sequence.

Because the light illumination in the image system is strictly controllable within precise limits, and because the scenes filmed originate as pre-prepared slides, a finished print of exceptionally high quality may be expected. The slides used to provide the scenes may readily be made uniform as to optical density within strict limits, and the resultant movie film will reflect the quality of such slides.

In outlining this invention, preferred embodiments have been described in detail in conjunction with constructional details. It is to be understood, however, that these details are offered by way of example only and not as limitations. Such embodiments of the invention as come within the scope and purview of the appended claims are to be considered as part of this invention.

What I claim as my invention is:

1. Apparatus for producing a movie film synchronized to a pre-recorded sound which comprises means for actuating said sound recording at speeds below the normal speed thereof, a fixed movie camera synchronized with said means, at least one image projecting means capable of transmitting a series of scenes in predetermined sequences through a lens into said movie camera, means for changing said scenes sequentially at intervals determined by the requirements of the pre-recorded sound, and a reflecting-transmitting mirror interposed between the projector and the camera lens and adapted to reflect a portion of the light impinging thereupon onto a monitor screen.

2. Apparatus for producing a movie film synchronized to a pre-recorded sound which comprises means for actuating said sound recording at speeds below the normal speed thereof, a fixed movie camera synchronized with said means, an image projection means having two revolving turrets capable of transmitting a series of scenes in predetermined sequences through a lens into said movie camera, each such turret capable of retaining a series of slides with one slide in each turret being in illuminable position at a time, a light source for each turret, independent means for varying the intensity of each said light source, means for changing the scenes sequentially at intervals determined by the requirements of the pre-recorded sound, and means for limiting the total intensity of both light sources to a predetermined maximum.

References Cited in the file of this patent

UNITED STATES PATENTS

| | | |
|---|---|---|
| 1,313,241 | Ashley | Aug. 19, 1919 |
| 1,591,118 | Friess | July 6, 1926 |
| 1,719,391 | Clapp | July 2, 1929 |
| 1,895,644 | Regan et al. | Jan. 31, 1933 |
| 1,909,339 | Fleischer | May 16, 1933 |
| 1,924,110 | Dessau | Aug. 29, 1933 |
| 1,941,341 | Disney et al. | Dec. 26, 1933 |
| 2,027,028 | Douden | Jan. 7, 1936 |
| 2,127,656 | Terry | Aug. 23, 1938 |
| 2,147,499 | Ross | Feb. 14, 1939 |
| 2,174,931 | Terry et al. | Oct. 3, 1939 |
| 2,503,083 | Waller | Apr. 4, 1950 |
| 2,606,476 | Waller et al. | Aug. 12, 1952 |
| 2,613,574 | Moss | Oct. 14, 1952 |